(12) United States Patent
Baumann et al.

(10) Patent No.: US 9,851,572 B2
(45) Date of Patent: Dec. 26, 2017

(54) BEAM COMBINING DEVICE FOR A LIGHT-SOURCE DEVICE

(71) Applicant: Karl Storz SE & Co. KG, Tuttlingen (DE)

(72) Inventors: Harald Baumann, Tuttlingen (DE); Bernhard Gloeggler, Tuttlingen (DE); Werner Goebel, Tuttlingen (DE)

(73) Assignee: Karl Storz SE & Co. KG, Tuttlingen (DE)

( * ) Notice: Subject to any disclaimer, the term of this patent is extended or adjusted under 35 U.S.C. 154(b) by 321 days.

(21) Appl. No.: 14/281,023

(22) Filed: May 19, 2014

(65) Prior Publication Data

US 2014/0340760 A1  Nov. 20, 2014

(30) Foreign Application Priority Data

May 17, 2013  (DE) .................. 10 2013 105 137

(51) Int. Cl.
*G02B 27/14* (2006.01)
*G02B 23/24* (2006.01)
*G02B 27/10* (2006.01)
*G02B 27/28* (2006.01)

(52) U.S. Cl.
CPC ....... *G02B 27/141* (2013.01); *G02B 23/2423* (2013.01); *G02B 27/1006* (2013.01); *G02B 27/283* (2013.01)

(58) Field of Classification Search
USPC ................................................. 359/619–634
See application file for complete search history.

(56) References Cited

U.S. PATENT DOCUMENTS

| | | | |
|---|---|---|---|
| 6,171,421 B1 | 1/2001 | Murata et al. | |
| 7,660,616 B1* | 2/2010 | Poore | A61B 5/14542 600/341 |
| 2006/0119951 A1 | 6/2006 | McGuire, Jr. | |
| 2009/0303707 A1* | 12/2009 | Huang | G02B 27/102 362/231 |

FOREIGN PATENT DOCUMENTS

| | | |
|---|---|---|
| DE | 20018213 U1 | 12/2000 |
| DE | 102007049626 A1 | 4/2009 |
| DE | 102010027540 A1 | 1/2012 |
| WO | 02080803 A1 | 10/2002 |
| WO | 2010148389 A2 | 12/2010 |

* cited by examiner

*Primary Examiner* — Brandi Thomas
(74) *Attorney, Agent, or Firm* — Whitmyer IP Group LLC (57) ABSTRACT

A beam combining device for combining light from a first light source and light from a second light source of a light-source device for a medical apparatus includes a body made of a transparent material, a face which reflects in at least either a dichroic or polarization-dependent manner and is situated in or on the body, which face is transparent to light having a first spectrum or a first polarization and reflects light having a second spectrum or a second polarization, and a light-entrance face on the body, which light-entrance face is provided and arranged so that light enters the beam combining device through the light-entrance face. At least either the light-entrance face or the face reflecting in a dichroic or polarization-dependent manner is curved.

10 Claims, 3 Drawing Sheets

BEAM COMBINING DEVICE FOR A LIGHT-SOURCE DEVICE

FIELD OF THE INVENTION

The present invention relates to a beam combining device for combining light from a first light source and light from a second light source in a light-source device, to a light-source device and to a medical apparatus.

BACKGROUND OF THE INVENTION

For diagnostic, therapeutic and surgical medical interventions, light sources for providing illumination light and/or light for exciting fluorescence, for hardening materials and for other purposes are generally required. By way of example, in the case of endoscopic interventions, the light source is generally arranged on the proximal end of the endoscope or connected to the latter by a flexible optical fiber. In order to be able to transmit as much light power or light flux as possible by means of optical waveguides which are as thin as possible, a light source with radiance L which is as high as possible is required.

In the case of endoscopes, a transmission of light by means of a single optical waveguide (in particular by means of a single bundle of optical fibers) is desired, even in the case of a plurality of different light sources, for example for illumination light (which is as white as possible) and for light for exciting fluorescence. For the purposes of beam combining or for superimposing light from a plurality of light sources, use is made, in particular, of faces reflecting in a dichroic or wavelength-dependent and/or polarization-dependent manner. Examples are described in WO 02080803 A1, DE 10 2007 049 626 A1 and DE 10 2010 027 540 A1. A disadvantage of many conventional arrangements consists of these not being very compact and/or not being sufficiently mechanically robust for preventing, in a sufficiently reliable manner, a misalignment as a result of mechanical impact or other influences occurring during practical use.

SUMMARY OF THE INVENTION

An object of the present invention consists of developing an improved beam combining device, an improved light-source device and an improved medical apparatus comprising a light-source device.

This object is achieved as specified in the claims.

Embodiments of the present invention are based on the concept of providing a face, reflecting in a dichroic or wavelength-dependent or polarization-dependent manner, in or on a body made of a transparent material and providing a light-entrance face for the light from one of the plurality of light sources on the body. As a result of curvature of the light-entrance face and/or of the face, reflecting in a dichroic and/or polarization-dependent manner, on the body, the divergence or convergence of entering light ray can be adapted to further requirements at the same time.

A beam combining device for combining light from a first light source and light from a second light source of a light-source device for a medical apparatus comprises a body made of a transparent material, a face which reflects in at least either a dichroic or polarization-dependent manner and is situated in or on the body, which face is transparent to light having a first spectrum or a first polarization and reflects light having a second spectrum or a second polarization, and a light-entrance face on the body, which light-entrance face is provided and arranged so that light enters the beam combining device through the light-entrance face, wherein at least either the light-entrance face or the face reflecting in a dichroic or polarization-dependent manner is curved.

The beam combining device is, in particular, provided and embodied for combining or superposing light from a first light source with a wide spectrum and light from a second light source with a narrow spectrum. The beam combining device is, in particular, provided and embodied for combining light from a first light source and light from a second light source, which light sources are both arranged in a light-source device, wherein the light-source device can be a component of an endoscope or another medical apparatus or can be connected or optically coupled to an endoscope or another medical apparatus by means of an optical fiber.

The beam combining device is, in particular, embodied for a first light source which e.g. comprises one or more light-emitting diodes and, optionally, one or more fluorescing or phosphorescing materials, in order to generate light which is perceived as white by the human eye and enables the best possible color reproduction. The beam combining device is, in particular, embodied for a second light source which comprises one or more laser diodes or other lasers or narrow-band light sources for exciting fluorescence for diagnostic purposes, for hardening materials, for thermal or photochemical or phototoxic coagulation or destruction of tissue or for other purposes. Alternatively, the beam combining device can be provided and embodied for a second light source, the light of which is superposed on that from the first light source and complements the latter, for example to improve the color reproduction. The beam combining device can be provided and embodied for simultaneous or alternating operation of the first light source and of the second light source.

The body is, in particular, transparent to light in the spectral range visible to the human eye. The body is, in particular, transparent to light in the near ultraviolet, in which an excitation of fluorescence for diagnostic purposes can occur. Alternatively or additionally, the body is transparent to light in the near infrared. The body can have an integral embodiment or be assembled from two or more parts.

The face reflecting in a dichroic and/or polarization-dependent manner can be planar or curved. The face reflecting in a dichroic and/or polarization-dependent manner can have the form of a section of a sphere surface, wherein the center of the sphere surface can lie within, or outside of, the body made of the transparent material. Alternatively, the face reflecting in a dichroic and/or polarization-dependent manner can have the form of a section of a rotational ellipsoid, wherein the axis of symmetry of the rotational ellipsoid can lie within, or outside of, the body and, in particular, be parallel or substantially parallel to an envisaged propagation direction of the light having the first spectrum. Alternatively, the face reflecting in a dichroic and/or polarization-dependent manner can have the form of a section of a lateral face of a circular cylinder or of a cone with a circular, elliptic or other base area, wherein the axis of symmetry of the circular cylinder or, optionally, an axis of symmetry of the cone can lie within, or outside of, the body and, in particular, be parallel or substantially parallel or orthogonal or substantially orthogonal to an envisaged propagation direction of light having the first spectrum. The reflecting face is, in particular, arranged in a region of the surface of the body or between two parts of the body. In particular, the reflecting face is formed by one or more material layers, which at the same time mechanically connect two parts of the body to one another.

The reflecting face is, in particular, transparent to light within at least a large part of the wavelength range visible to the human eye and transparent to light in the violet or ultraviolet wavelength range. As a result, illumination light from a white-light source can pass through the face reflecting in a dichroic manner in a substantially uninfluenced manner, and fluorescence excitation light entering into the beam combining apparatus through the light-entrance face can, by the face reflecting in a dichroic manner, be deflected into the same direction in which the white light passes through the beam combining device.

In addition to combining or superposing light from two light sources, the above-described beam combining device can, at the same time, enable a modification and adaptation of the divergence or convergence of the light emanating from one of the two light sources by a curvature of the light-entrance face and/or by a curvature of the face reflecting in a dichroic and/or polarization-dependent manner. By arranging both the reflecting face and the light-entrance face on the same transparent body, a misalignment is precluded—apart from completely destructive influences. Moreover, the beam combining device can have a very compact embodiment and hence only require little installation space.

In the case of a beam combining device as is described here, the light-entrance face, in particular, has the form of a section of a lateral face of a cylinder or of a cone.

Within the geometric meaning intended here, a cylinder is a body which is delimited by two planar and parallel faces, which are also referred to as base area and cover area, and a lateral face or cylinder face. The lateral face or cylinder face is formed by parallel straight lines connecting points corresponding to one another on the edges of the planar faces. Thus, a cylinder is created by displacing a planar face or curve along a straight line not lying in the plane. The base area and cover area can be circular or have any other form. If the base area and the cover area are circular, the cylinder is a circular cylinder. If the straight lines forming the lateral face or cylinder face are perpendicular to the planar faces, the cylinder is referred to as a right cylinder.

Here, a cylinder axis of a cylinder refers to any straight line which is parallel to the straight lines forming the lateral face or cylinder face. The cylinder axis specifies the direction in which the cylinder is translation invariant within certain boundaries. The axis of symmetry of a right circular cylinder is the straight line lying at the center of the base area and of the cover area. The right circular cylinder is rotationally symmetric with respect to this axis of symmetry.

Within the geometric meaning intended here, a cone is a body which is created when all points of a planar base area are connected with straight lines to a point lying outside of the plane. The point lying outside of the plane is referred to as tip or apex. The lateral face or cone face is created by a straight line connection between all points of the edge of the base area and the tip. The edge or the delimiting line of the base area is also referred to as a directrix. The base area can be circular or have another form. If the base area is circular, the cone is a circular cone. If the straight line through the center of the base area and the tip is perpendicular to the base area, the cone is a right circular cone.

Here, and in the following text, the cone axis of a cone is the straight line through the tip of the cone and through the geometric center of the base area of the cone. A right circular cone is rotationally symmetric with respect to the cone axis.

The light-entrance face has, in particular, the form of a section of a lateral face of a circular cylinder or of a circular cone. The light-entrance face has, in particular, the form of an area created by the intersection of the lateral face of the cylinder or cone with a further cylinder or a further cone, wherein, in particular, the further cylinder is a circular cylinder or, in particular, the further cone is a circular cone, and wherein, in particular, the axis of the further cylinder or of the further cone intersects with the lateral face in a perpendicular manner.

In particular, if the light-entrance face has the form of a section of a lateral face of a circular cylinder or of a circular cone with a very small aperture angle (angle of the tip of the cone), the light-entrance face acts like a cylindrical positive lens to light passing therethrough. As a result, the light-entrance face can, in a plane perpendicular to the cylinder or cone axis, reduce the divergence of a light beam emanating from a light source, increase the convergence of the light beam or make a light beam which is divergent outside of the body convergent within the body. Therefore, in particular, the light-entrance face can contribute to modifying a non-rotationally symmetric light beam, adapting it to the requirements and, in particular, reshaping it into a rotationally symmetric or approximately rotationally symmetric light beam.

In the case of a beam combining device, as is described here, the body, in particular, substantially has the form of a section of a cylinder or of a cone, wherein the reflecting face is arranged in or on the body and tilted with respect to the center axis of the body.

The body has, in particular, the form or substantially has the form of a section of a circular cylinder or of a circular cone. The body has, in particular, two planar or substantially planar surface sections, wherein one of the planar surface sections is arranged perpendicular to the cylinder axis and the other planar surface section is arranged at an angle of 45 degrees with respect to the cylinder axis or likewise perpendicular to the cylinder axis. If both planar surface sections of the body are perpendicular to the cylinder axis, the reflecting face is, in particular, arranged within the body, in particular between two parts from which the body is assembled. If one of the two planar surface sections of the body is tilted with respect to the cylinder axis, the reflecting face is, in particular, arranged on this tilted surface section or occupies this entire tilted surface section.

Alternatively, the section of the cylinder or cone can have one or two curved surface sections instead of the two planar surface sections.

In particular, the body has the shape of an intersection between a prism and a circular cylinder, wherein the prism has a triangular base area, a right angle and two 45-degree angles. Alternatively, the body can be assembled from two sub-bodies of this form in such a way that the overall body has the form of a right circular cylinder. In this case, the reflecting face is arranged, in particular, between the two sub-bodies.

The center axis is the cylinder axis in the case of the cylinder and the straight line through the tip and center or geometric center of the base area in the case of a cone. The reflecting face includes an angle with the center axis which is greater than 0 degrees, in particular at least 30 degrees, and which is less than 90 degrees, in particular at most 60 degrees. In particular, the angle between the reflecting face and the center axis is 45 degrees or lies in the range between 40 degrees and 50 degrees. In the case of a planar face, the angle means the angle between the surface normal and the center axis. In the case of a curved face, this means the angle between the mean surface normal and the center axis or the angle between the surface normal in the center of the face (in particular in the geometric center of the face) and the center axis.

The body is, in particular, embodied and arranged in such a way that light from a light source, which is not reflected by the face reflecting in a dichroic or polarization-dependent manner, enters through a planar or curved end face of the cylinder or cone, propagates substantially parallel to the cylinder axis or cone axis in the body and reemerges through an opposite planar or curved end face of the cylinder or cone, and that light from a second light source enters the body substantially perpendicular to the cylinder axis or cone axis through the light-entrance face, is reflected on the face reflecting in a dichroic or polarization-dependent manner and emerges on a planar or curved end face of the cylinder together with the light from the first light source and substantially in the same direction.

In the case of a beam combining device, as is described here, the beam combining device in particular comprises a first body made of a transparent material and a second body made of a transparent material, wherein the reflecting face is arranged between the first body and the second body, and wherein the first body and the second body together have the form of a section of a cylinder or of a cone.

In particular, the first body and the second body together have the form of a section of a circular cylinder or of a circular cone with two parallel or substantially parallel, in each case planar or curved end faces, which are, in particular, perpendicular or substantially perpendicular to the cylinder axis. A curved face is perpendicular to the cylinder axis if the mean surface normal of said face or if the surface normal of said face in the center or in the geometric center of the curved face is parallel to the cylinder axis.

In the case of a beam combining device, as is described here, the lateral face of the body comprises, in particular, a reflective coating away from the light-entrance face.

The reflective coating comprises, in particular, a silver layer or another metallic layer. In the region of the light-entrance face, the reflective coating has a window-like opening, within which the reflective coating has not been applied or removed after application. In order to improve the coupling of light through the curved light-entrance face, a reflection-reducing coating can be applied in the region thereof instead of the reflective coating.

In the case of a beam combining device, as is described here, the body is produced, in particular, by virtue of one or two bodies originally with a triangular prismatic form being ground to be cylindrical, which bodies were cemented to one another before or after the grinding.

A beam combining device, as is described here, in particular comprises a further light-entrance face, on which a non-imaging optical device for shaping a light beam of a light source is provided. Non-imaging optics is also known as anidolic optics. Using the means from non-imaging optics, it is possible to couple a particularly large part of the power contained in the light beam into the beam combining device and to shape the light beam in accordance with the respective requirements.

A beam combining device, as is described here, furthermore comprises, in particular, an optical fiber taper or a concentric optical concentrator or a compound parabolic concentrator between a further light-entrance face and the body.

Concentric optical concentrators are predominantly known by their English designation, which is abbreviated COC. Compound parabolic concentrators are known, in particular, by their English designation, which is abbreviated CPC. The further light-entrance face and the optical fiber taper or the concentric optical concentrator or the compound parabolic concentrator are, in particular, provided for coupling in white light, or light appearing substantially white to the human eye, from one or more light-emitting diodes or another broad-band light source.

A beam combining device, as is described here, furthermore comprises, in particular, a mixer for homogenizing the distribution of light from the first light source and light from the second light source.

The mixer has, in particular, the form of a long rod made of glass or another transparent material. The mixer can be joined to the body in or on which the reflecting face and the light-entrance face are provided, or it can be made integrally with said body or with part of the body. The mixer is, in particular, circular cylindrical. The lateral face of the mixer is, in particular, provided with a reflective coating. In particular, the length of the mixer is at least half the quotient of the diameter thereof to the tangent of the divergence angle, where the divergence angle is the largest angle between two light rays within the light beam to be homogenized, entering into the mixer.

By multiple reflection of almost all light rays within the light beam on the long lateral face of the thin mixer, there can be extensive homogenization of the intensity and radiance, to be precise both of the light from the first light source and of the light from the second light source.

A light-source device for a medical apparatus comprises a first light source for generating light having a first spectrum, a second light source for generating light having a second spectrum and a beam combining device, as is described here.

The first light source is, in particular, a broad-band light source. The first light source comprises, in particular, one or more inorganic or organic light-emitting diodes, an RGB light-emitting diode and, optionally, one or more phosphorescing or fluorescing materials. In particular, the first light source is embodied to generate light which is perceived as white or approximately white by the human eye and enables the best possible color reproduction.

The second light source is, in particular, a narrow-band light source. The second light source comprises, in particular, one or more laser diodes or other lasers for generating light for exciting fluorescence, for thermal or photochemical or phototoxic coagulation or damage or destruction of tissue, for hardening a material, for complementing the spectrum of the first light source and therefore for improving the color reproduction, or for another purpose.

In particular, the light from the second light source is coupled into the beam combining device by the curved light-entrance face and reflected on the face thereof, reflecting in a dichroic or polarization-dependent manner, and the light from the first light source is likewise coupled into the beam combining device via the further light-entrance face already mentioned above, wherein the light from the first light source passes through the face reflecting in a dichroic or polarization-dependent manner.

In the case of a light-source device, as is described here, in which the body made of a transparent material has the form of a section of a cylinder, the second light source is arranged, in particular, opposite the light-entrance face and embodied to emit a light beam, the divergence of which in the direction perpendicular to the cylinder axis is wider than in the direction parallel to the cylinder axis.

Laser diodes in particular often generate a light beam which has a pronounced elliptical shape or is otherwise not rotationally symmetric. The direction perpendicular to the light beam in which the light beam has a maximum divergence is also referred to as the fast axis. The direction perpendicular to the light beam in which the divergence of the light beam has a minimum is also referred to as a slow axis. A convex cylindrically curved light-entrance face for the light beam from a laser diode, arranged in such a way that the slow axis is parallel to the cylinder axis can reduce the divergence in the direction perpendicular to the cylinder axis. Hence, the cylindrically curved light-entrance face can influence the light beam generated by the laser diode in such a way that it becomes more similar to a rotationally symmetric light beam.

A light-source device, as is described here, furthermore comprises, in particular, a light-refracting device between the second light source and the light-entrance face of the beam combining device, for changing the divergence of a light beam generated by the first light source.

In the case of a light-source device, as is described here, the light-refracting device can comprise a concave cylindrical lens, which increases the divergence of a light beam, emitted by the first light source, in the direction parallel to the cylinder axis of the light-entrance face.

To this end, the cylinder axis of the concave cylindrical lens is, in particular, arranged perpendicular to a light beam emanating from the second light source and perpendicular to the cylinder axis of the light-entrance face of the body made of the transparent material.

A light-refracting device, in particular a concave cylindrical lens, as is described here, can contribute to reshaping a light beam, generated by the second light source, in a desired manner, in particular in the direction of increased rotational symmetry.

A medical apparatus comprises a light-source device, as is described here.

By way of example, the medical apparatus is an endoscope, on the proximal end of which the light-source device can be arranged. By way of example, the medical apparatus is alternatively embodied to generate light and to be coupled to an endoscope by means of a flexible optical fiber in order to provide light for the endoscope.

BRIEF DESCRIPTION OF THE DRAWINGS

In the following, embodiments are explained in more detail on the basis of the attached figures. In detail.

DETAILED DESCRIPTION OF THE INVENTION

Figure 1:
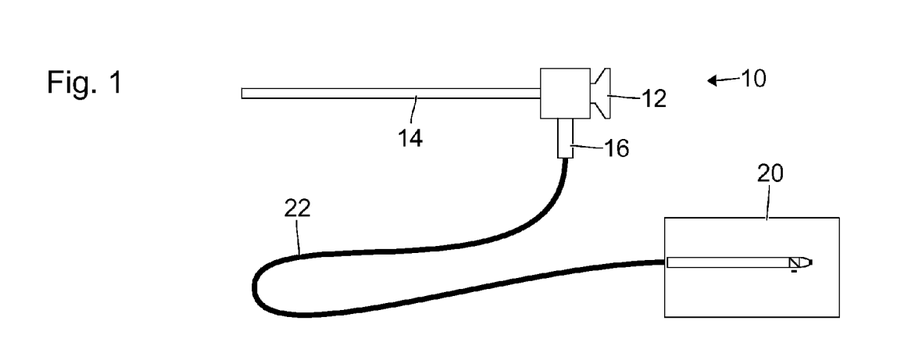
FIG. 1 shows a schematic illustration of an endoscope comprising a light-source device.

FIG. 1 shows a schematic illustration of an endoscope 10 for medical or technical or other non-medical applications, and a light-source device 20 for the endoscope 10. The endoscope 10 comprises an eyepiece 12 at the proximal end and a straight-lined or curved, rigid or flexible shank 14. Furthermore, a coupling 16 for connecting the endoscope 10 with the light-source device 20 by means of a flexible optical fiber 22 is provided at the proximal end of the endoscope 10. The light-source device 20 is embodied to generate, alternately or simultaneously, illumination light perceived as white by the human eye and enabling the best possible color reproduction, and fluorescence excitation light suitable for exciting fluorescence. To this end, the light-source device 20 comprises two light sources and a beam combining device, which are described below with reference to FIGS. 3 to 6.

Figure 2:
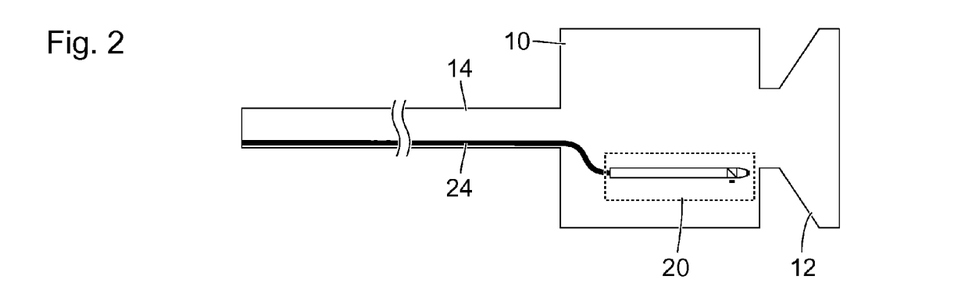
FIG. 2 shows a schematic illustration of a further endoscope comprising a light-source device.

FIG. 2 shows a schematic illustration of a further endoscope 10 for medical, technical or other non-medical applications, which is similar in terms of some features to the endoscope depicted above on the basis of FIG. 1. The following text only describes features and properties in terms of which the endoscope 10 differs from the endoscope depicted above on the basis of FIG. 1.

The endoscope 10 differs from the endoscope depicted above on the basis of FIG. 1 by virtue of, in particular, the fact that it does not depend on an external light-source device and therefore, in particular, does not have a coupling for an optical fiber either. Instead, the light-source device 20 is arranged in the endoscope 10 and, in particular, in the vicinity of the proximal end of the endoscope 10. Like the light-source device depicted above on the basis of FIG. 1, the light-source device comprises two light sources and a beam combining device 50. The light-source device 20 is connected to the distal end of the endoscope 10 by means of an optical waveguide 24 in the shank 14 of the endoscope 10, at which distal end light can emerge from the light-source device 20 in order to illuminate an object to be observed.

Figure 3:
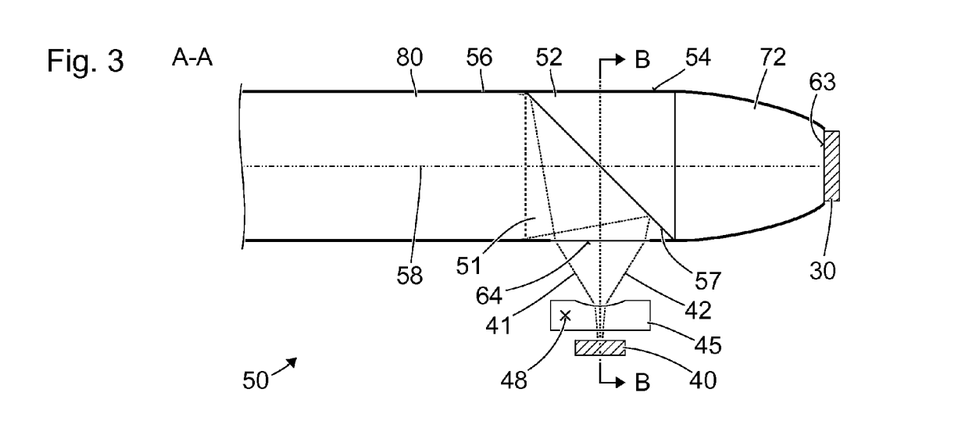
FIG. 3 shows a schematic sectional illustration of a beam combining device.

FIG. 3 shows a schematic sectional illustration of two light sources 30, 40 and a beam combining device 50, which can be components of the light-source device 20, as is depicted above on the basis of FIG. 1 or 2. The beam combining device 50 comprises a first transparent body 51 and a second transparent body 52, which, in the depicted sectional plane, each have an isosceles and right-angled triangular cross-section. A face 57 reflecting in a dichroic manner is arranged between the transparent bodies 51, 52. The face 57 reflecting in a dichroic manner is, in particular, planar. Alternatively, the face 57 reflecting in a dichroic manner can be curved.

Furthermore, the beam combining device 50 comprises a compound parabolic concentrator 72 between the first light source 30 and the second transparent body 52. Furthermore, the beam combining device 50 comprises a mixer 80 in the form of a long straight rod made of a transparent material. A dashed line between the first transparent body 51 and the mixer 80 indicates that the first transparent body 51 and the mixer 80 can be produced in an integral manner or joined after being produced separately.

Together, the transparent bodies 51, 52 and the mixer 80 substantially have the form of a circular cylinder with a lateral face 54 and a cylinder axis 58. The compound parabolic concentrator 72 is rotationally symmetric with respect to the cylinder axis 58. The lateral face 54 of the circular cylinder formed by the transparent bodies 51, 52 and the mixer 80, and the lateral face of the compound parabolic concentrator 72 are provided with a reflective coating or mirroring 56 which, in particular, comprises a vapor-deposited silver layer.

The contour of the cross-section of the compound parabolic concentrator 72 shown in FIG. 3 comprises two symmetrically arranged sections of two parabolas, the axes of which need not be parallel to the cylinder axis 58. The compound parabolic concentrator 72 is embodied to couple a proportion of the light generated by the first light source 30 that is as high as possible into the second body 52 with an angular distribution that is as small as possible.

The cylindrical and rotational symmetry of the beam combining device 50 is broken between the transparent bodies 51, 52, by the face 57 reflecting in a dichroic manner, and broken by a light-entrance face 64 on the first transparent body 51. In the region of the light-entrance face 64, the reflective coating 56 has a window-like opening. In particular, provision is made for a reflection-reducing coating instead of the reflective coating 56 in the region of the light-entrance face 64, which reflection-reducing coating enables coupling of light into the first body 51 with the smallest possible losses.

The first light source 30 comprises, in particular, one or more light-emitting diodes and, optionally, one or more fluorescing or phosphorescing materials in addition thereto, in order to generate illumination light which is perceived as white or approximately white by the human eye and enables the best possible color reproduction. The first light source 30 is arranged on a light-entrance face 63 on the compound parabolic concentrator 72 and connected thereto using transparent cement or joined thereto in any other way. The first light source 30 is embodied and arranged in such a way that illumination light generated thereby on average propagates parallel to the cylinder axis 58. The face 57 reflecting in a dichroic manner is embodied to have a degree of transmission for the light from the first light source 30 which is as high as possible and a degree of reflection which is as low as possible.

The second light source 40 is, in particular, a laser diode for generating fluorescence excitation light within a narrow wavelength range in the violet or near ultraviolet region. The laser diode 40 is arranged to emit a light beam in a direction perpendicular to the cylinder axis 58. The center of the light beam emitted by the laser diode 40 and the cylinder axis 58 lie in the plane of the drawing of FIG. 3.

A cylindrical lens 45 with a concave surface is optionally arranged on the beam combining device 50 between the laser diode 40 and the light-entrance face 64. The cylinder axis 48 of the cylindrical lens 45, along which the cylindrical lens 45 is substantially translation invariant and which is parallel to the surfaces of the cylindrical lens 45 visible in FIG. 3, is perpendicular to the plane of the drawing of FIG. 3 and perpendicular to the cylinder axis 58 of the beam combining device 50. The cylindrical lens 45 increases the originally small divergence of the light beam, generated by the laser diode 40, in the plane of the drawing of FIG. 3. In the direction perpendicular to the plane of the drawing of FIG. 3, the cylindrical lens 45 does not influence the divergence of the light beam generated by the laser diode 40. For illustrative purposes and in a purely schematic manner, edges 41, 42 of the light beam generated by the laser diode are indicated in FIG. 3.

The face 57 reflecting in a dichroic manner is arranged at 45 degrees angles with respect to the cylinder axis 58 of the beam combining device 50 and with respect to the direction of the light beam generated by the laser diode 40. The face 57 reflecting in a dichroic manner is embodied to have a degree of reflection which is as high as possible and a degree of transmission which is as low as possible in respect of the spectrum generated by the laser diode 40. A light beam generated by the laser diode 40 is widened in the plane of the drawing of FIG. 3 by the cylindrical lens 45, enters the first transparent body 51 through the light-entrance face 64, is reflected at the face 57 reflecting in a dichroic manner and, thereafter, on average propagates parallel to the cylinder axis 58 of the beam combining device 50. As a result, downstream in terms of light propagation of the face 57 reflecting in a dichroic manner, the light from the first light source 30 and the light from the laser diode 40 propagate together and substantially parallel to the cylinder axis 58 of the beam combining device 50. As a result of predominantly repeated or multiple reflections on the reflective coating 56, in particular in the mixer 80, an intensity and radiance which is approximately homogeneous or constant over the cross-section is generated, both for light from the first light source 30 and for light from the laser diode 40.

Figure 4:
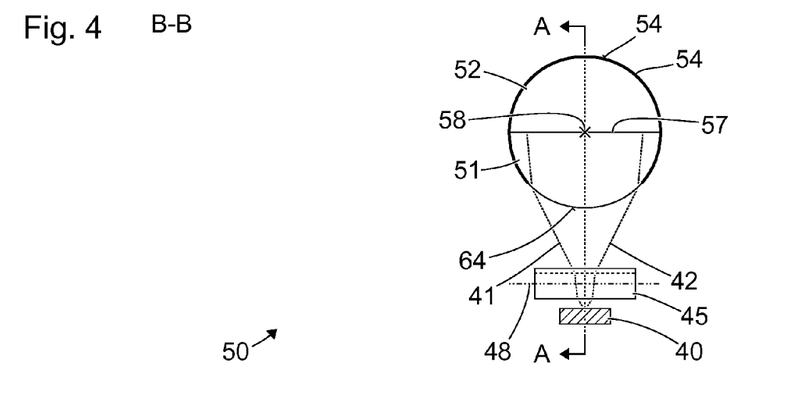
FIG. 4 shows a further schematic sectional illustration of the beam combining device from FIG. 3.

FIG. 4 shows a further schematic sectional illustration of the laser diode 40 and of the beam combining device 50 from FIG. 3. The sectional plane B-B in FIG. 4 is perpendicular to the sectional plane A-A in FIG. 3, perpendicular to the cylinder axis 58 of the beam combining device 50, parallel to the cylinder axis 48 of the cylindrical lens 45 and contains the center of the light beam generated by the laser diode 40. The position of the sectional plane A-A in FIG. 3 is indicated in FIG. 4. The location of the sectional plane B-B is indicated in FIG. 3.

In FIG. 4, the substantially circular cross-section which the first transparent body 51 and the second transparent body 52 have together, and the reflective coating 56 of the lateral face 54 in the region away from the light-entrance face 64 can be identified.

FIG. 4 indicates that the light beam generated by the laser diode 40 has a divergence in the sectional plane B-B in FIG. 4 which is not influenced by the cylindrical lens 45, at least after the light emerges from the cylindrical lens 45. FIG. 4 furthermore indicates that the divergence of the light beam generated by the laser diode 40 is greater in the sectional plane B-B than in the sectional plane A-A in FIG. 3. The curvature of the light-entrance face 64 in the sectional plane B-B in FIG. 4 has a reducing effect on the divergence of the light beam generated by the laser diode 40. Therefore, the curved light-entrance face 64 contributes to reshaping the cross-section, which was originally not rotationally symmetric in a pronounced manner, of the light beam generated by the laser diode 40, making the cross section of the light beam closer to being rotationally symmetric and adapting the light beam to the light beam generated by the first light source (cf. FIG. 3).

Figure 5:
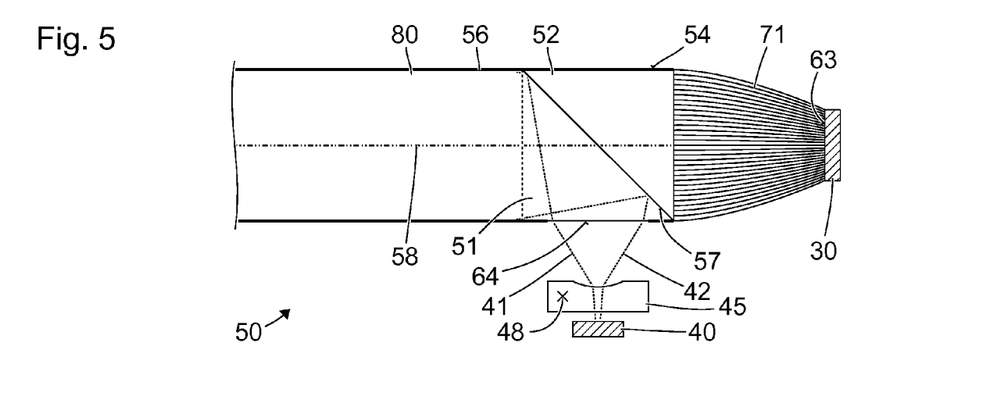
FIG. 5 shows a schematic sectional illustration of a further beam combining device.

FIG. 5 shows a schematic sectional illustration of a further embodiment of a first light source 30, a second light source 40 and a beam combining device 50, which can be components of a light-source device 20, as depicted above on the basis of FIG. 1 or 2. The sectional plane and plane of the drawing in FIG. 5 corresponds to the sectional plane and plane of the drawing A-A in FIG. 3.

The embodiment in FIG. 5 is similar in terms of some features and properties to the embodiment in FIGS. 3 and 4. The following text only describes features and properties in terms of which the embodiment in FIG. 5 differs from the embodiment depicted above on the basis of FIGS. 3 and 4.

The embodiment in FIG. 5 differs from the embodiment depicted above on the basis of FIGS. 3 and 4 by virtue of, in particular, the fact that an optical fiber taper 71 is provided instead of a compound parabolic concentrator. The first light source 30 is arranged on the light-entrance face 63 of the optical fiber taper 71 and joined thereto, in particular by means of transparent cement. The light-exit face of the optical fiber taper 72 is joined to a light-entrance face of the second transparent body 52.

Figure 6:
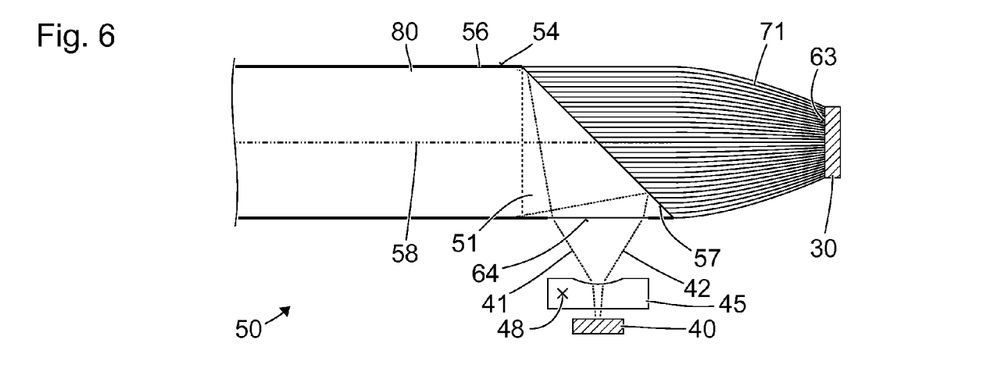
FIG. 6 shows a schematic sectional illustration of a further beam combining device.

FIG. 6 shows a schematic sectional illustration of a further embodiment of a first light source 30, a second light source 40 and a beam combining device 50, which can be components of a light-source device 20, as depicted above on the basis of FIG. 1 or 2. The sectional plane and plane of the drawing in FIG. 6 corresponds to the sectional plane and plane of the drawing A-A in FIG. 3 and to the sectional plane and plane of the drawing in FIG. 5.

The embodiment in FIG. 6 is similar in terms of some features and properties to the embodiment in FIGS. 3 to 5. The following text only describes features and properties in terms of which the embodiment in FIG. 6 differs from the embodiment in FIG. 5.

The embodiment in FIG. 6 differs from the embodiment depicted above on the basis of FIG. 5 by virtue of, in particular, the fact that provision is only made for the first transparent body 51, in which light emanating from the laser diode 40 propagates before and after reflection on the face 57 reflecting in a dichroic manner. Instead of the second transparent body 52, the optical fiber taper 71 is extended downstream in terms of light propagation as far as the face 57 reflecting in a dichroic manner and connected directly or—deviating from the illustration in FIG. 6—indirectly via a thin transparent layer to the face 57 reflecting in a dichroic manner.

In the exemplary embodiments depicted above on the basis of FIGS. 1 to 6, the combination or superposition of the light beams from two light sources 30, 40 can, alternatively or additionally, have other reasons. In particular, the second light source 40 can be provided and embodied for complementing the spectrum from the first light source 30 and for improving the achievable color reproduction. Furthermore, the light from the second light source 40 can, alternatively or additionally, be provided for other functions or effects. Furthermore, the functions of the light sources 30, 40 can be interchanged. Here, the beam-shaping effect of the curved light-entrance face 64 is particularly advantageous if the associated light source 40 generates a non-rotationally symmetric light beam and a light distribution which is as symmetrical as possible should be present at the output of the beam combining device 50.

Figure 7:
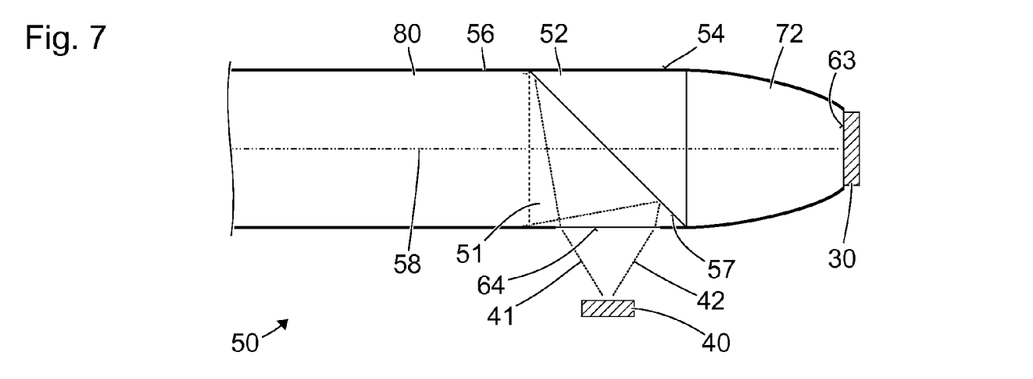
FIG. 7 shows a schematic sectional illustration of a further beam combining device.

FIG. 7 shows a schematic sectional illustration of a further embodiment of a first light source 30, a second light source 40 and a beam combining device 50, which can be components of a light-source device 20, as depicted above on the basis of FIG. 1 or 2. The sectional plane and plane of the drawing in FIG. 7 corresponds to the sectional plane and plane of the drawing A-A in FIG. 3 and to the sectional planes and planes of the drawing in FIGS. 5 and 6.

The embodiment in FIG. 7 is similar in terms of some features and properties to the embodiment in FIGS. 3 to 6. The following text only describes features and properties in terms of which the embodiment in FIG. 7 differs from the embodiment in FIG. 3.

The embodiment in FIG. 7 differs from the embodiment depicted above on the basis of FIG. 3 by virtue of, in particular, the fact that no cylindrical lens is provided between the laser diode 40 and the light-entrance face 64 of the beam combining device 50. Deviating from the illustration in FIG. 6, the beam combining device 50 can be embodied like what is depicted above on the basis of FIGS. 5 and 6. Expressed differently, the embodiments in FIGS. 5 and 6 can be embodied, like the embodiment in FIG. 7, without a cylindrical lens.

Figure 8:
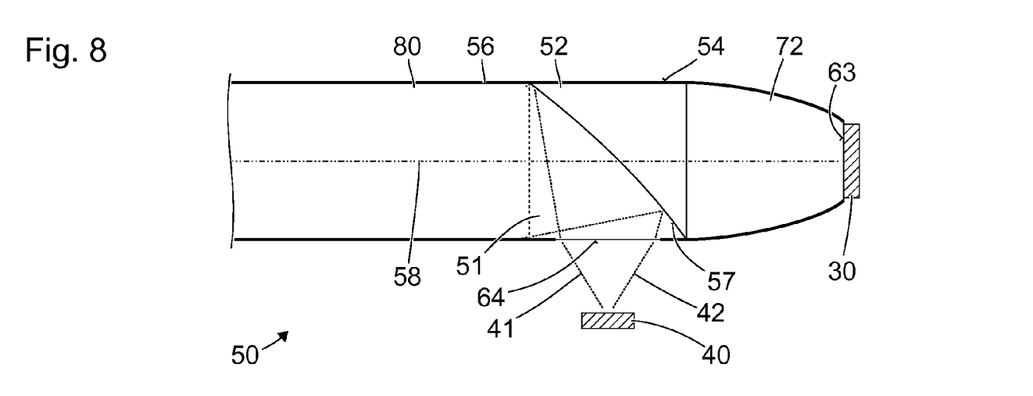
FIG. 8 shows a schematic sectional illustration of a further beam combining device.

FIG. 8 shows a schematic sectional illustration of a further embodiment of a first light source 30, a second light source 40 and a beam combining device 50, which can be components of a light-source device 20, as depicted above on the basis of FIG. 1 or 2. The sectional plane and plane of the drawing in FIG. 8 corresponds to the sectional plane and plane of the drawing A-A in FIG. 3 and to the sectional planes and planes of the drawing in FIGS. 5 to 7.

The embodiment in FIG. 8 is similar in terms of some features and properties to the embodiment in FIGS. 3 to 7. The following text only describes features and properties in terms of which the embodiment in FIG. 8 differs from the embodiment in FIG. 7.

The embodiment in FIG. 8 differs from the embodiment depicted above on the basis of FIG. 7 by virtue of, in particular, the fact that the face 57 reflecting in a dichroic and/or polarization-dependent manner is curved. The reflecting face 57 has, in particular, the form of a section of a spherical surface, a surface of a rotational ellipsoid, of a paraboloid of revolution, of a circular cylinder, of another cylinder or of a cone with a circular, elliptical or another base area. Here, the center of the sphere or the rotational axis of the rotational ellipsoid, of the paraboloid of revolution, of the circular cylinder, of the other cylinder or, optionally, of the cone can lie within, or outside of, the first transparent body 51 or the second transparent body 52. The rotational axis of the rotational ellipsoid, of the paraboloid of revolution, of the circular cylinder, of the other cylinder or, optionally, of the cone is, in particular, parallel or orthogonal to the cylinder axis 58 of the beam combining device 50.

Deviating from the illustration in FIG. 8, a cylindrical lens can be provided between the laser diode 40 and the light-entrance face 64 of the beam combining device 50, as depicted above on the basis of FIGS. 3 to 6.

Furthermore, the beam combining device 50 can, deviating from the illustration FIG. 8, comprise an optical fiber taper and, in this respect, be embodied similar to what is depicted above on the basis of FIG. 5 or similar to what is depicted above on the basis of FIG. 6. Expressed differently, the face 57 reflecting in a dichroic and/or polarization-dependent manner can be curved in the embodiments in FIGS. 5 and 6, similar to the embodiment in FIG. 8.

REFERENCE SIGNS

10 Endoscope
12 Eyepiece of the endoscope 10
14 Shank of the endoscope 10
16 Coupling for optical fiber 22
20 Light-source device
22 Optical fiber between the light-source device 20 and endoscope 10
24 Optical waveguide in the shank 14
30 Broad-band light-emitting diode
40 Laser diode
41 Edge of light beam emitted by the laser diode
42 Edge of light beam emitted by the laser diode
45 Cylindrical lens between laser diode 40 and beam combining device 50
48 Cylinder axis of the cylindrical lens 45
50 Beam combining device
51 First transparent body of the beam combining device 50
52 Second transparent body of the beam combining device 50
54 Lateral face of the beam combining device 50
56 Reflective coating of the lateral face 54

57 Face reflecting in a dichroic and/or polarization-dependent manner, between the first transparent body 51 and the second transparent body 52
58 Cylinder axis of the beam combining device 50
63 Light-entrance face for light from the broad-band light source 30
64 Light-entrance face for light from the laser diode 40
65 Light-exit face for light from both the broad-band light-emitting diode 30 and the laser diode 40
71 Optical fiber taper
72 Concentric optical concentrator or compound parabolic concentrator
80 Mixer

The invention claimed is:

1. A beam combining device for combining light from a first light source and light from a second light source of a light-source device for a medical apparatus, comprising:
   a body made of a transparent material;
   a face which reflects in at least either a dichroic or polarization-dependent manner and is situated in or on the body, which face is transparent to light having a first spectrum or a first polarization and reflects light having a second spectrum or a second polarization; and
   a light-entrance face on the body, which light-entrance face is provided and arranged so that light enters the beam combining device through the light-entrance face;
   wherein the light-entrance face has the form of a section of an arcuate face of a cylinder or of a cone;
   wherein an arcuate face of a section of the body away from the light-entrance face includes a reflective coating.

2. The beam combining device according to claim 1, in which the body substantially has the form of a section of a cylinder or of a cone, wherein the face which reflects is arranged in or on the body and tilted with respect to a center axis of the body.

3. The beam combining device according to claim 1, wherein the beam combining device comprises a first body made of a transparent material and a second body made of a transparent material;
   wherein the face which reflects is arranged between the first body and the second body; and
   wherein the first body and the second body together have the form of a section of a cylinder or of a cone.

4. The beam combining device according to claim 1, furthermore comprising:
   an optical fiber taper or a concentric optical concentrator or a compound parabolic concentrator between a further light-entrance face and the body.

5. The beam combining device according to claim 1, furthermore comprising:
   a mixer for homogenizing the distribution of light from the first light source and light from the second light source.

6. A light-source device for a medical apparatus, comprising:
   a first light source for generating light having a first spectrum;
   a second light source for generating light having a second spectrum;
   a body made of a transparent material;
   a face which reflects in at least either a dichroic or polarization-dependent manner and is situated in or on the body, which face is transparent to light having a first spectrum or a first polarization and reflects light having a second spectrum or a second polarization; and
   a light-entrance face on the body, which light-entrance face is provided and arranged so that light enters the beam combining device through the light-entrance face;
   wherein the light-entrance face has the form of a section of an arcuate face of a cylinder or of a cone; and
   wherein an arcuate face of a section of the body away from the light-entrance face includes a reflective coating.

7. The light-source device according to claim 6, in which the body has the form of a section of a cylinder, in which the second light source is arranged opposite the light-entrance face and embodied to emit a light beam, the divergence of which in the direction perpendicular to the cylinder axis is wider than in the direction parallel to the cylinder axis.

8. The light-source device according to claim 7, furthermore comprising:
   a light-refracting device between the laser or the other narrow-band light source and the light-entrance face of the beam combining device, for changing the divergence of a light beam generated by the laser or another narrow-band light source.

9. The light-source device according to claim 8, in which the light-refracting device comprises a concave cylindrical lens, which increases the divergence of a light beam, emitted by the laser or the other narrow-band light source, in the direction parallel to the cylinder axis of the light-entrance face.

10. A medical apparatus, comprising;
   a first light source for generating light having a first spectrum;
   a second light source for generating light having a second spectrum;
   a body made of a transparent material;
   a face which reflects in at least either a dichroic or polarization-dependent manner and is situated in or on the body, which face is transparent to light having a first spectrum or a first polarization and reflects light having a second spectrum or a second polarization; and
   a light-entrance face on the body, which light-entrance face is provided and arranged so that light enters the beam combining device through the light-entrance face;
   wherein the light-entrance face has the form of a section of an arcuate face of a cylinder or of a cone; and
   wherein an arcuate face of a section of the body away from the light-entrance face includes a reflective coating.

* * * * *